United States Patent [19]

Motte et al.

[11] Patent Number: 4,549,301
[45] Date of Patent: Oct. 22, 1985

[54] DIRECT-CURRENT ELECTRIC-ARC FURNACE AND METHOD OF OPERATING SAME

[75] Inventors: Jean-Pierre Motte; Ghislain Maurer, both of Metz, France

[73] Assignees: Institute de Recherches de la Siderurgie Francaise (IRSID), Saint-Germain-En-Laye; Clecim, Courbevoie, both of France

[21] Appl. No.: 499,908

[22] Filed: Jun. 1, 1983

[30] Foreign Application Priority Data

Jun. 1, 1982 [FR] France .................................. 82 09486

[51] Int. Cl.$^4$ ............................................. H05B 7/20
[52] U.S. Cl. .................................... 373/108; 373/105
[58] Field of Search ............... 373/108, 105, 102, 104, 373/106

[56] References Cited

U.S. PATENT DOCUMENTS

| 932,835 | 8/1909 | Trillon | 373/108 |
| 4,254,298 | 3/1981 | Svendsen | 373/108 |

Primary Examiner—A. D. Pellinen
Assistant Examiner—Gregory D. Thompson
Attorney, Agent, or Firm—Michael J. Striker

[57] ABSTRACT

An electric arc furnace comprising at least one pair of electrodes extending through the roof of the furnace for the creation of electric arcs between each of the electrodes and the charge to be melted, and a source for applying direct current to each of said pairs of electrodes, respectively of different polarities. Preferably the furnace contains also an electric probe extending through the bottom of the furnace to determine the potential of the molten charge and means for adjusting the vertical position of each electrode for maintaining the potential difference between each electrode and the molten charge at a predetermined value.

3 Claims, 1 Drawing Figure

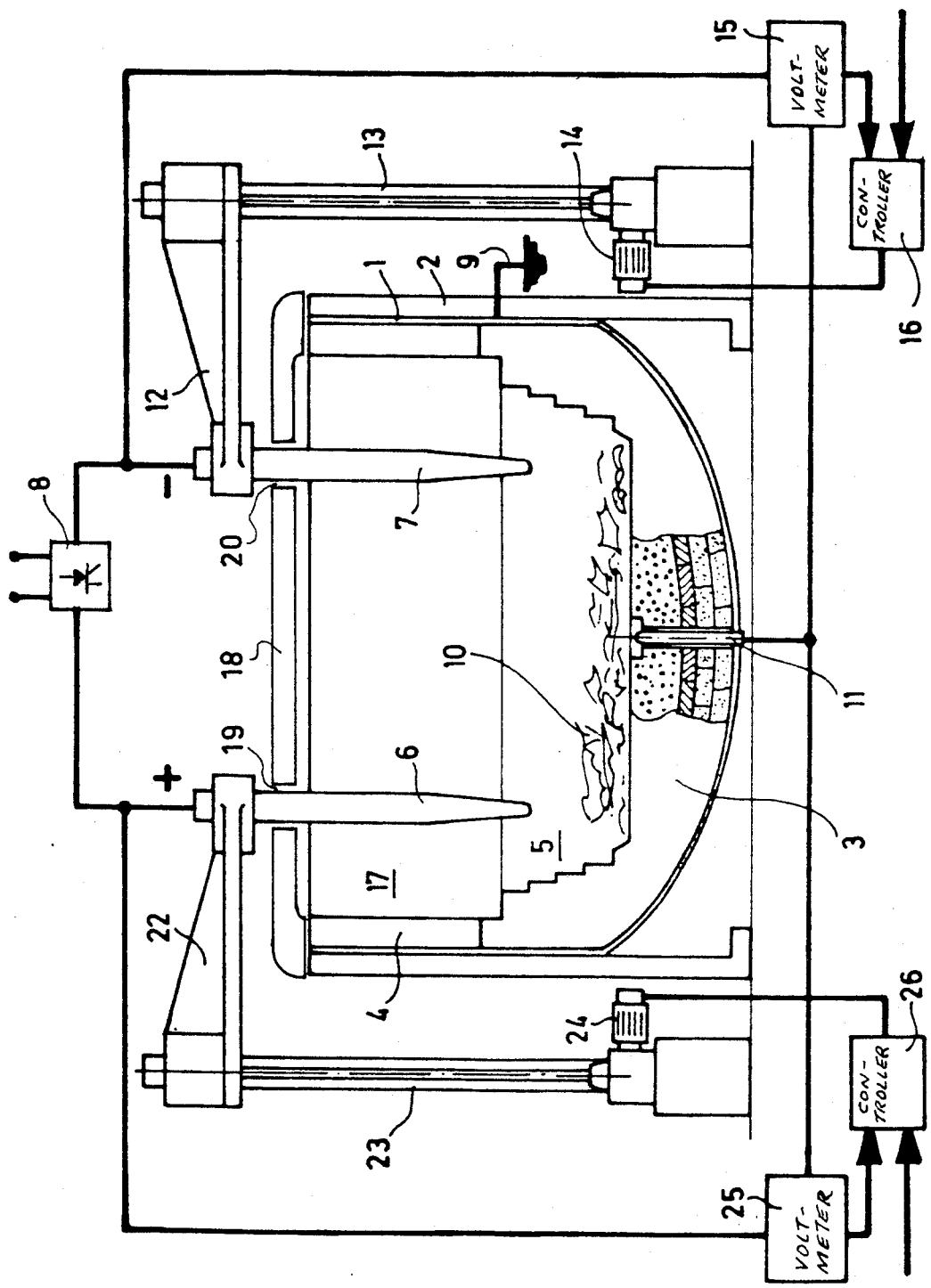

DIRECT-CURRENT ELECTRIC-ARC FURNACE AND METHOD OF OPERATING SAME

BACKGROUND OF THE INVENTION

The present invention relates to melting of metals, metal alloys or any conductive material by electric arcs.

In metallurgy, arc furnaces are used which permit the circulation of an electric current through a conductive mass to be melted by means of an electric arc created between such a mass and an electrode disposed above.

Actually, furnaces of this type are usually operated by a three-phase alternating electric current applied to three electrodes extending through the arched roof of the furnace towards the mass to be melted. Thus, three arcs are created, respectively between each of the electrodes and the mass to be melted, which represents the neutral, and each of the arcs functions with alternating current, each electrode being alternately a positive and a negative pole. This usual procedure has the disadvantages of being expensive due to rapid consumption of the electrodes, as well as due to limitations of the magnitude of the electric heating due to difficulties connected with the instability of the arcs.

In order to resolve these problems, a solution has already been proposed according to which the electric power is produced by direct current with the creation of a single arc. This known arrangement requires, however, another electrode of opposite polarity from that which is disposed above the mass to be melted and extending through the bottom of the furnace to assure by electrical contact with the bottom of this mass a return flow of the current. An electrode extending through the bottom of the furnace creates, however, some difficulties connected with the mounting and function of such an electrode. The technological limits due to the necessity to pass this electrode through the refractory wall of the furnace, the contact of this electrode with the metal during the melting, the dimension of the electrode, the necessity of cooling the same, etc., make it very difficult to apply through such electrodes heavy electric currents which are desirable for furnaces of great capacity.

SUMMARY OF THE INVENTION

It is an object of the present invention to operate an electric arc furnace with direct current while avoiding the use of an electrode extending through the bottom of the furnace and supplying the furnace with direct current of great power.

It is a further object of the present invention to provide a method of melting metals, metal alloys or any electric conductive materials caused by the circulation of an electric current through the conductive mass to be melted by the creation of two electric arcs each of which is produced by one of a pair of electrodes, and each of which is supplied with direct current, respectively of two different polarities.

It is also an object of the present invention to provide a melting furnace for carrying out the above method, which is characterized by at least one pair of electrodes extending through the arched roof of the furnace, for the creation of electric arcs between each of the electrodes and the metallic mass to be melted and means to supply direct electric current to each of the pair of electrodes, respectively at two different polarities.

Preferably, the furnace is also provided with a conductive probe extending through the bottom of the furnace in contact with the mass to be melted for sensing the potential of the mass, while permitting to utilize this information to control the parameters of the arcs by adjusting the vertical position of the electrodes relative to the mass to be melted.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

BRIEF DESCRIPTION OF THE DRAWING

The single FIGURE schematically illustrates a side view of the arc furnace according to the present invention, partly in cross section.

DESCRIPTION OF THE PREFERRED EMBODIMENT

Referring now to the drawing, it will be seen that the arc furnace according to the present invention comprises in the usual manner a metallic vessel or tank 1 covered by stationary arched roof 18 and supported by a frame 2, whereas the interior of the tank 1 is covered at its lower part 5 by a refractory lining 3 and in its upper part 17 by cooling panels 4. This tank defines thus the operating chamber of the furnace, that is, the chamber for the reception of the solid metallic charge to be melted, usually scrap iron.

During the melting a liquid metallic mass 10 thus forms at the lower portion 5 of the furnace, which thus gradually fills up to the end of the fusion process.

Two electrodes 6 and 7 pass in vertical direction through the orifices 19 and 20 provided in the roof 18 of the furnace through the upper portion of the latter. These electrodes are usually made of graphite. The melting of the metallic charge is electrically produced due to arcs created between each of the electrodes and the charge. According to the present invention the electrodes are supplied with direct current and the electrodes 6 and 7 are respectively connected to the two opposite terminals of a thyristor 8. During operation, the molten mass 10 is at a potential floating intermediately between those of the two electrodes of opposed polarity due to the groundings of the metallic tank at 9.

The furnace is further equipped with means detecting this floating potential and using it in the regulation of the electrodes 6 and 7. For this purpose there is provided a conductive probe 11 transversing the bottom of the tank 1 and its refractory lining in such a way that the inner end thereof is in contact with the molten metal 10. Since this probe 11 plays no role in the transmission of the electric power necessary for the melting of the charge, it is constructed as a metallic rod of relatively small diameter, for example 5–10 cm, preferably surrounded by a cooling jacket to retard the melting of its extremity which is in contact with the molten material.

The two electrodes 6 and 7 are supported by devices which allow them to be retracted vertically through the cover 18 for replacement with fresh electrodes, in a manner which is known in the art. Thus, each of the electrodes is mounted on a support bracket or horizontal arm 12, 22, each having an outer end at which the respective electrode 6, 7 is fixed and which slides in respective vertical masts 13 or 23 under the command of a jack system driven by an electric motor 14 or 24 only schematically illustrated in the drawing, since, as mentioned before, such systems are known in the art. The displacement of the electrodes permits same to move closely to the scrap to start the arcs at the beginning of the melting operation, and after the arcs are started moves the electrodes in upward direction to regulate the length of the arcs during the melting operation on the basis of the information furnished by the probe 11.

Thus, in the illustrated example, two identical regulating assemblies are respectively associated with the two electrodes 6 and 7 of opposite polarities. Each of the regulating assemblies comprises a sensor device or voltmeter 15 or 25 for measuring the voltage difference between the electrical supply conductor of the electrodes 6 or 7 and the extremity of the probe 11, and a regulator 16 or 26 respectively in circuit with the devices 15 and 25 to control rotation of the motor 14 or 24 in such a manner to maintain the potential difference measured by the device 15 or 25 at a predetermined value.

It will be understood that each of the elements described above, or two or more together, may also find a useful application in other types of electric arc furnaces differing from the types described above.

While the invention has been illustrated and described as embodied in an electric arc furnace, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific features of this invention.

What is claimed as new and desired to be protected by Letters Patent is set forth in the appended claims:

1. An electric arc furnace comprising:
   a vessel adapted to hold a charg of metal to be melted;
   a vertically displaceable positive electrode spaced vertically above the charge in the vessel;
   a vertically displaceable negative electrode spaced horizontally from the positive electrode and vertically above the charge in the vessel;
   direct-current power-supply means for oppositely energizing the electrodes and thereby drawing one arc between the positive electrode and the charge and another arc between the negative electrode and the charge;
   a probe in the vessel underneath the electrodes and in electrical contact with the charge;
   measuring means connected to the respective electrodes and to the probe for detecting the potential difference between the respective electrode and the charge; and
   means connected to the measuring means and to the vertically displaceable electrodes for changing the vertical spacing between each of the electrodes and the charge in the furnace in accordance with the respective detected potential difference in such a manner as to maintain the potential difference between each electrode and the charge at a predetermined value.

2. The electric-arc furnace defined in claim 1 wherein the probe is a small-diameter metallic rod projecting through the vessel into the charge.

3. The electric-arc furnace defined in claim 2 wherein the probe has a diameter between 5 cm and 10 cm.

* * * * *